US009069653B2

(12) United States Patent
Be et al.

(10) Patent No.: US 9,069,653 B2
(45) Date of Patent: Jun. 30, 2015

(54) METHODS FOR UTILIZING STOP SIGN AND TRAFFIC LIGHT DETECTIONS TO ENHANCE FUEL ECONOMY AND SAFETY

(71) Applicant: Ford Global Technologies, LLC, Dearborn, MI (US)

(72) Inventors: Tuan Anh Be, Livonia, MI (US); William Najib Mansur, West Bloomfield, MI (US); Mark Douglas Malone, Canton, MI (US); Leonid Tikh, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/829,538

(22) Filed: Mar. 14, 2013

(65) Prior Publication Data
US 2013/0297124 A1 Nov. 7, 2013

Related U.S. Application Data

(60) Provisional application No. 61/643,166, filed on May 4, 2012.

(51) Int. Cl.
| G06F 17/00 | (2006.01) |
| B60W 10/06 | (2006.01) |
| B60W 10/08 | (2006.01) |
| B60W 20/00 | (2006.01) |
| B60W 10/02 | (2006.01) |
| B60W 30/18 | (2012.01) |
| B60K 6/48 | (2007.10) |

(52) U.S. Cl.
CPC ............... *G06F 17/00* (2013.01); *B60W 10/06* (2013.01); *B60W 10/08* (2013.01); *B60W 20/00* (2013.01); *Y10S 903/93* (2013.01); *Y02T 10/6286* (2013.01); *B60W 10/02* (2013.01); *B60W 30/18018* (2013.01); *B60K 2006/4825* (2013.01); *B60W 2550/22* (2013.01); *Y02T 10/6252* (2013.01)

(58) Field of Classification Search
CPC .................................................. B60W 2550/22
See application file for complete search history.

(56) References Cited

U.S. PATENT DOCUMENTS

| 5,451,820 | A | 9/1995 | Gotoh et al. |
| 6,283,086 | B1 | 9/2001 | Yamamoto et al. |
| 6,629,515 | B1 | 10/2003 | Yamamoto et al. |
| 7,404,784 | B2 | 7/2008 | De Mersseman |
| 8,855,844 | B2 * | 10/2014 | Schwindt ........................ 701/22 |
| 2007/0222638 | A1 * | 9/2007 | Chen et al. .................... 340/901 |
| 2010/0070128 | A1 * | 3/2010 | Johnson .......................... 701/33 |
| 2011/0040432 | A1 * | 2/2011 | Kaltenbach et al. ............ 701/22 |
| 2011/0071746 | A1 * | 3/2011 | O'Connor Gibson et al. .............................. 701/101 |
| 2012/0083960 | A1 * | 4/2012 | Zhu et al. ........................ 701/23 |

* cited by examiner

*Primary Examiner* — Helal A Algahaim
*Assistant Examiner* — Kelly D Williams
(74) *Attorney, Agent, or Firm* — Julia Voutyras; Alleman Hall McCoy Russell & Tuttle LLP

(57) ABSTRACT

Methods for operating a vehicle as the vehicle approaches an intersection with a traffic control device are provided herein. One example method includes detecting a traffic control device at an intersection the vehicle is approaching, and releasing and applying a disconnect clutch arranged in a driveline of the vehicle intermediate an engine and a starter/generator based on a type of the detected traffic control device. Because releasing the disconnect clutch disconnects the engine from the vehicle driveline, the engine may be turned off to increase fuel efficiency while the disconnect clutch is released.

15 Claims, 9 Drawing Sheets

METHODS FOR UTILIZING STOP SIGN AND TRAFFIC LIGHT DETECTIONS TO ENHANCE FUEL ECONOMY AND SAFETY

CROSS REFERENCE TO RELATED APPLICATIONS

The present application claims priority to U.S. Provisional Patent Application No. 61/643,166 filed on May 4, 2012, the entire contents of which are incorporated herein by reference for all purposes.

BACKGROUND AND SUMMARY

Traffic control devices, such as stop signs and traffic lights, are used to regulate, warn, or guide vehicular traffic. However, problems arise when vehicle operators fail to abide by traffic control devices, whether intentionally or unintentionally. As one example, when vehicle operators fail to stop at stop signs, or accelerate when a traffic light is red or about to turn red, accidents and fatalities may result, as well as costs associated with repairing damages and hospital bills for injured parties. As another example, vehicle operators may accelerate as they approach an intersection and then slam on the brakes when they notice a stop sign, or slam on the brakes when a traffic light changes from green to yellow to red before they have reached the intersection. Abruptly braking in this way may waste fuel and cause unnecessary wear and tear of vehicle components. Accordingly, vehicle operators' failure to abide by traffic control devices may lead to safety hazards as well as inefficient fuel usage.

Various approaches for reducing the safety hazards and fuel inefficiencies associated with traffic control devices are known. In one approach, US 2010/0070128 describes providing motorists with information regarding intersections on their travel route, thus enabling them to operate their vehicles in a manner that increases fuel economy and/or road safety. For example, a computing device receives traffic-related data from a plurality of sensors at traffic signaling locations, analyzes the data, and wirelessly transmits relevant data to on-vehicle technology which may automatically adjust vehicle operating parameters or alert the driver to adjust operating parameters manually. This traffic-related data may include the signaling status of a traffic light, e.g., an indication of when the traffic light will turn green. However, in this approach, the traffic-related data does not include data on static traffic control devices such as stop signs.

The inventors herein have recognized that it may be advantageous to develop different vehicle control strategies corresponding to different traffic control devices. That is, the inventors herein have recognized that a type of traffic control device (e.g., stop sign or traffic light) may be determined as a vehicle approaches an intersection, and a control strategy tailored to promoting fuel efficiency and safety for known vehicle behavior in approaching that type of traffic control device (e.g., obligatory stopping at a stop sign and conditional stopping at a traffic light depending on its state) may be adopted.

In one example approach, a method for operating a vehicle comprises adjusting operation of the vehicle in response to whether a detected traffic control device is a stop sign is or a traffic light. For example, if the detected traffic control device is a stop sign, the method may further include evaluating a current vehicle state, the current vehicle state based on a distance between the vehicle and an intersection associated with the stop sign, a distance between the vehicle and a next forward vehicle, a speed of the vehicle, and a deceleration rate of the vehicle, and determining a vehicle control strategy based on the current vehicle state.

Alternatively, if the detected traffic control device is a traffic light, the method may further include evaluating a current vehicle state, the current vehicle state based on a distance between the vehicle and an intersection associated with the traffic light, a distance between the vehicle and a next forward vehicle, a speed of the vehicle, and a deceleration rate of the vehicle, determining a current traffic light state, predicting a timing of a traffic light state change, and determining a vehicle control strategy based on the current vehicle state, the current traffic light state, and the predicted timing of the traffic light state change.

The inventors herein have further noted that it in hybrid vehicles, it may be advantageous for the vehicle control strategy to include adjusting operation of a disconnect clutch based on the type of traffic control device detected at an oncoming intersection. For example, one approach may include detecting a traffic control device at an intersection the vehicle is approaching, and releasing and applying a disconnect clutch arranged in a driveline of the vehicle intermediate an engine and a starter/generator based on the type of traffic control device detected.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to methods for adjusting vehicle operation, including adjusting operation of a disconnect clutch arranged in a driveline of the vehicle in some examples, based on detection of a traffic control device. Specifically, vehicle operation is adjusted in a different manner depending on a type of traffic control device detected. While stop signs and traffic lights are described in particular herein, it will be appreciated that the disclosed methods may be modified to apply to other types of traffic control devices, e.g. yield signs, without departing from the scope of the present disclosure.

Figure 1:
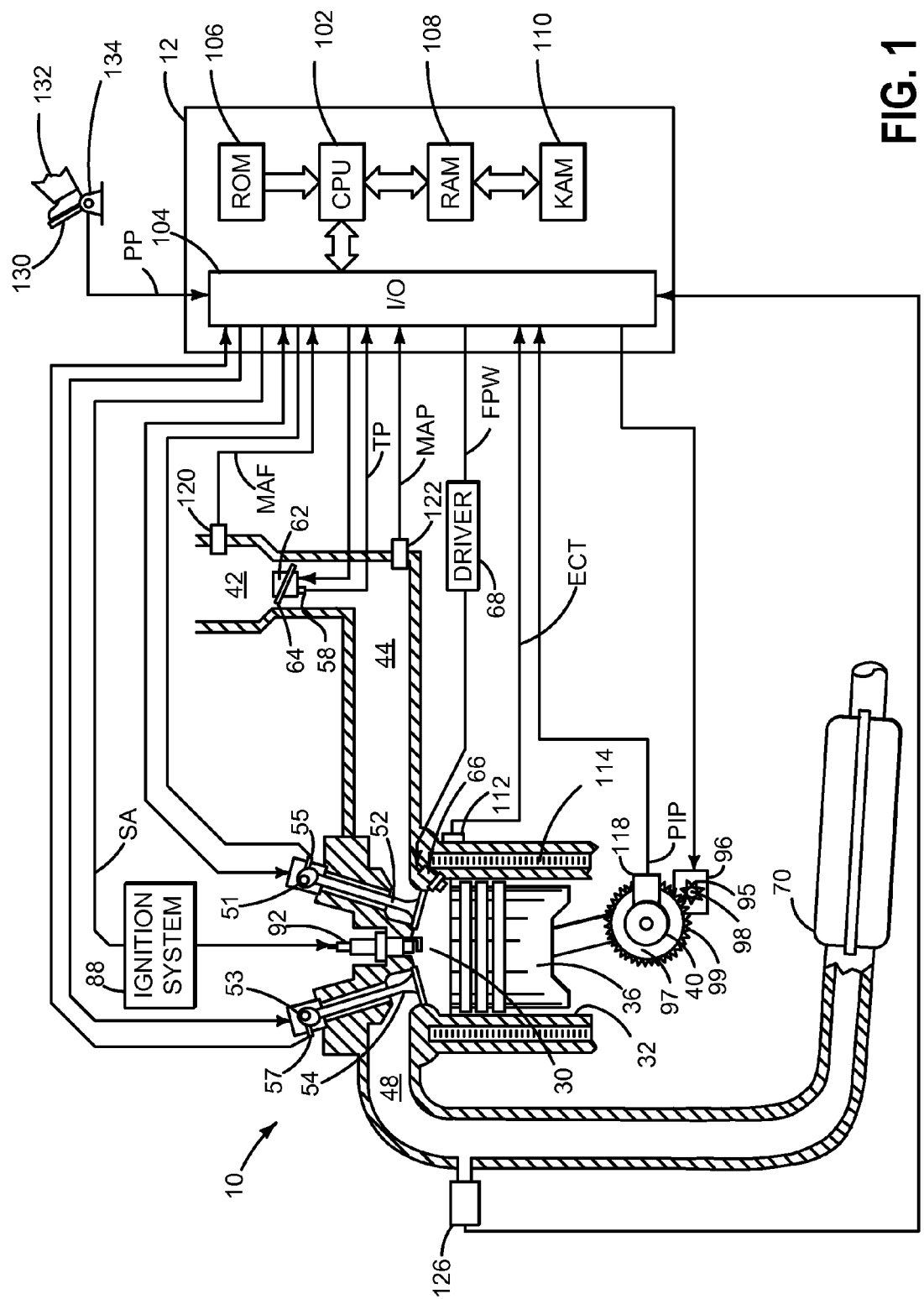
FIG. 1 shows a schematic diagram of an engine.
Figure 2:
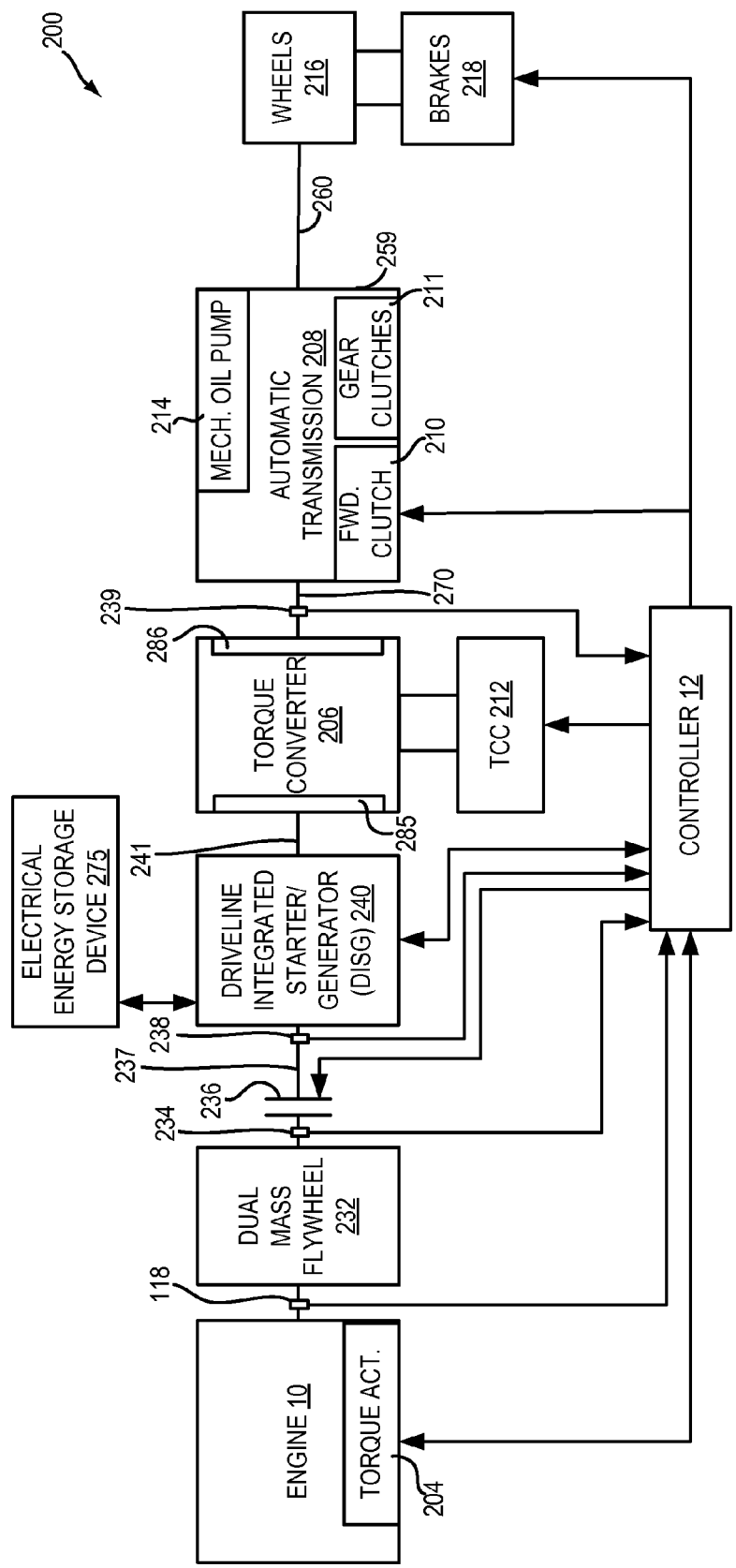
FIG. 2 shows an example vehicle driveline configuration.

In some examples, the vehicle may be a hybrid vehicle. One example of a hybrid vehicle includes a vehicle with an engine that may be selectively coupled to an electrical machine and a transmission according to vehicle operating conditions, as shown in FIGS. 1-2. The engine may be selectively coupled to the electric machine and transmission via an electrically or hydraulically actuated disconnect clutch. The disconnect clutch allows the electric machine to provide torque to vehicle wheels during low torque demand conditions without having to operate the engine and without having to supply torque to rotate the engine when it is not combusting an air-fuel mixture. The disconnect clutch may also be used to restart the engine from a condition of no rotation via the electric machine. It will be appreciated that while the present disclosure describes operation of the disconnect clutch in the context of controlling operation of a vehicle as it approaches an intersection regulated by a traffic control device, such operation constitutes just one of many examples of disconnect clutch operation in a hybrid vehicle driveline.

In the embodiments described herein, the engine may be operated with or without a driveline integrated starter/generator (DISG) during vehicle operation. The driveline integrated starter/generator is integrated into the driveline and rotates whenever the torque converter impeller rotates.

As described herein, the engine may be shut down, to zero speed (and the disconnect clutch opened), to reduce fuel consumption when the operator releases the accelerator pedal. Accordingly, the engine is shut down when the vehicle is coming to a stop, or at other times when the torque from the motor is sufficient to accelerate the vehicle or overcome the road load. The engine may also be shut down after the vehicle comes to a stop. The selection of the engine shutdown operation and engine restart operation, including the condition at which the engine is shut down/restarted and whether or not it is shut down/restarted, is based on various parameters, including vehicle operator accelerator and brake pedal depression amounts, vehicle speed, ambient temperature, engine temperature, battery state of charge, etc. For example, when the operator applies the accelerator pedal and the desired torque exceeds that which the motor can provide, the engine is restarted to supplement the motor output torque. In addition, the engine can be restarted during a coasting condition if the battery state of charge drops below a minimum threshold, where the engine is restarted and provides torque to operate the motor as a generator to recharge the battery. During the engine restart process, either the disconnect clutch or a separate starter motor may be used to crank the engine depending on operating conditions as described herein. Once combustion commences, either the engine is accelerated to match the input speed of the motor or the disconnect clutch engagement/slip is controlled by controlling the clutch pressure to pull the engine up to the motor input speed.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses for every revolution of the crankshaft, from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by ignition devices such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above description is merely an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10, which may correspond to engine 10 of FIG. 1. Engine 10 may be started with an engine starting system such as that shown in FIG. 1, or via DISG 240. Further, engine 10 may generate or adjust torque via a torque actuator 204, such as a fuel injector, throttle, etc.

Engine output torque may be transmitted to an input side of dual mass flywheel 232. Engine speed, as well as dual mass flywheel input side position and speed, may be determined via engine position sensor 118. Dual mass flywheel 232 may include springs and separate masses (not shown) for dampening driveline torque disturbances. The output side of dual mass flywheel 232 is shown as being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to impeller 285 of torque converter 206 via shaft 241. The upstream side of DISG 240 is mechanically coupled to the disconnect clutch 236. Torque converter 206 includes a turbine 286 to output torque to input shaft 270. Input shaft 270 mechanically couples torque converter 206 to automatic transmission 208.

Torque converter 206 also includes a torque converter bypass lock-up clutch (TCC) 212. Torque is directly transferred from impeller 285 to turbine 286 when TCC 212 is locked. TCC 212 is electrically operated by controller 12. Alternatively, TCC 212 may be hydraulically locked. In one example, torque converter 206 may be referred to as a component of the transmission. Torque converter turbine speed and position may be determined via position sensor 239. In some examples, however, sensors 238 and/or 239 may be torque sensors, or combination position and torque sensors.

When TCC 212 is fully disengaged, torque converter 206 transmits engine torque to automatic transmission 208 via fluid transfer between the torque converter turbine 286 and torque converter impeller 285, thereby enabling torque multiplication. In contrast, when TCC 212 is fully engaged, engine output torque is directly transferred via TCC 212 to an input shaft 270 of transmission 208. Alternatively, TCC 212 may be partially engaged, thereby enabling the amount of torque directly relayed to the transmission to be adjusted. The controller 12 may be configured to adjust the amount of torque transmitted by torque converter 206 by adjusting TCC 212 in response to various engine operating conditions, or based on a driver-based engine operation request.

Automatic transmission 208 includes gear clutches 211 (e.g., for gears 1-6) and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may engage the wheel brakes. In the same way, a frictional force to wheels 216 may be reduced by disengaging wheel brakes 218 in response to the driver releasing his foot from a brake pedal. Further, the wheel brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or TCC 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from the DISG by adjusting current flowing to and from field and/or armature windings of the DISG as is known in the art.

Figure 3:
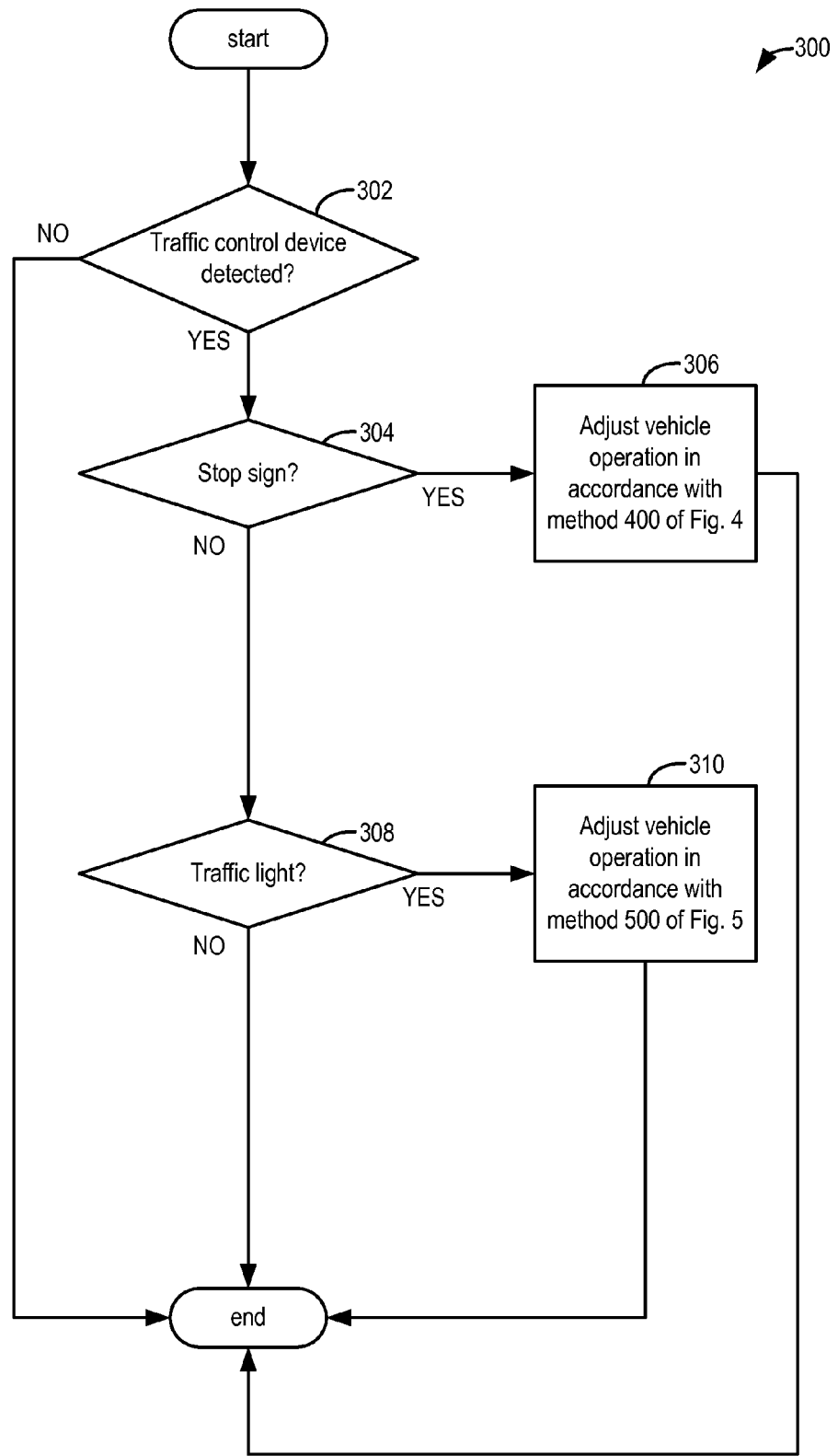
FIG. 3 shows an example method for adjusting vehicle operation based on a type of traffic control device detected.

Referring now to FIG. 3, an example method for adjusting vehicle operation based on a type of traffic control device detected is shown. The method of FIG. 3 may be stored as executable instructions in non-transitory memory of controller 12 shown in FIGS. 1-2.

At 302, method 300 includes determining if a traffic control device is detected. For example, a stop sign may be detected via one or more of a navigation system using database lookup (e.g., government database lookup), radar detection onboard the vehicle, a passive response system embedded on the stop sign, and/or camera and image processing, among other examples. Further, the method may include evaluating the stop sign using image processing as a last check point of data to make fine adjustments to subsequent calculations. A traffic light may be detected via one or more of visual recognition (including identification of the image and distance of the traffic light), transmitted signals between the vehicle and a transmitter mounted on the traffic light, triangulation based on remote broadcasts (via a cellular tower or other common ground-based broadcast systems), GPS-equipped wireless device connection (versus in-vehicle or external database look-up of traffic light systems), and/or communication of vehicle location (using GPS information along with navigation or roadside identification systems, etc.) to a central database that transmits whether the signal is near, among other examples. It will be appreciated that each of the methods for detection of a traffic control device may be utilized independently of one another, or as multiple redundant verifications to improve robustness and safety.

If a traffic control device is detected, the answer is yes and method 300 proceeds to 304. Otherwise, the answer is no and method 300 ends.

At 304, method 300 includes determining whether the detected traffic control device is a stop sign. If the answer at 304 is yes, method 300 proceeds to 306 to adjust operation of the vehicle in accordance with the method 400 of FIG. 4, as detailed below. Otherwise, if the answer at 304 is no, method 300 proceeds to 308.

At 308, method 300 includes determining whether the detected traffic control device is a traffic light. If the answer at 308 is yes, method 300 proceeds to 310 to adjust operation of the vehicle in accordance with method 500 of FIG. 5, as detailed below. Otherwise, if the answer at 308 is no, method 300 ends.

In some examples, steps 304 and 308 may be performed in a different order, or simultaneously. Similarly, as opposed to determining whether the detected traffic control device is a stop sign and then determining whether the detected traffic control device is a traffic light, both of these steps may occur at step 302 (e.g., step 302 may include identifying a type of traffic control device detected, upon detection of a traffic control device).

Figure 4:
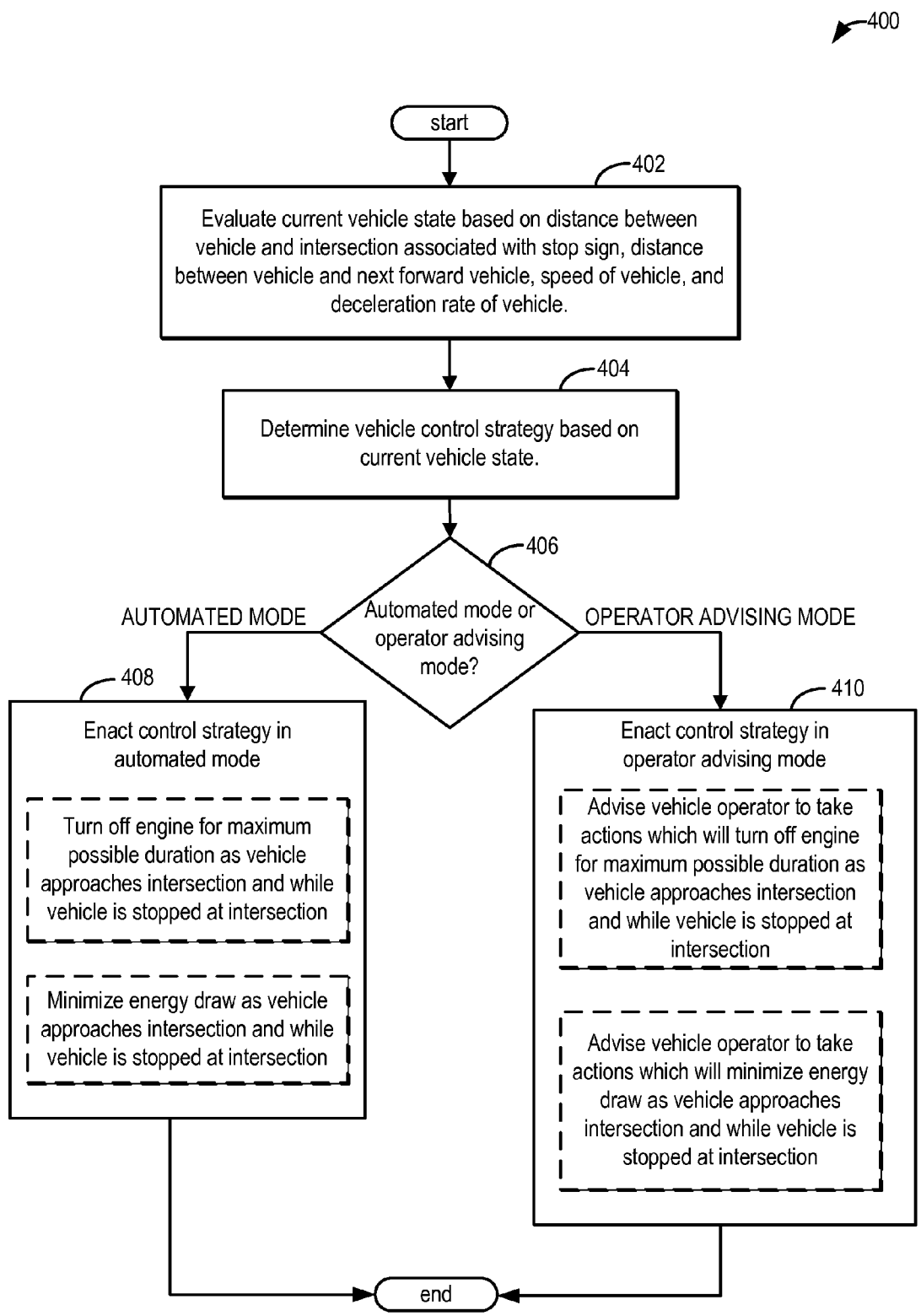
FIG. 4 shows an example method for controlling a vehicle when a stop sign is detected, to be used in conjunction with the method of FIG. 3.

Referring now to FIG. 4, it shows an example method 400 for controlling a vehicle when a stop sign is detected, to be used in conjunction with method 300 of FIG. 3. For example, method 400 may be performed at step 306 of method 300. The method of FIG. 4 may be stored as executable instructions in non-transitory memory of controller 12 shown in FIGS. 1-2.

At 402, method 400 includes evaluating a current vehicle state based on a distance between the vehicle and an intersection associated with the detected stop sign, a distance between the vehicle and a next forward vehicle (i.e., a vehicle in front of and in the same lane as the operator's vehicle), a speed of the vehicle, and a deceleration rate of the vehicle. Depending on the method of detection of the stop sign, the distance between the vehicle and the intersection associated with the stop sign may be determined using a visual recognition method, among other examples. The distance between the vehicle and the next forward vehicle (if one exists) may be determined using an approach such as that used in adaptive cruise control systems, e.g., a vehicle-mounted radar system that identifies a separation distance between the operator's vehicle and the next forward vehicle, among other examples. As for the vehicle's speed and deceleration rate, the values of these parameters may be stored in the control system (e.g., in memory of controller 12) such that they may be easily accessed when the current vehicle state is evaluated.

After 402, method 400 continues to 404. At 404, method 400 includes determining a vehicle control strategy based on the current vehicle state (e.g., based on the various parameters described above for step 402 which define the current vehicle state). In one example, the vehicle control strategy may be based in part on the time it will take the vehicle to reach the stop sign (referred to herein as parameter Z) at its current speed and deceleration rate. If X represents the distance from the vehicle to the intersection, Y represents the distance to a next forward vehicle (Y=0 if there is no next forward vehicle), parameter Z may be calculated using a functional expression including X and Y (e.g., a functional expression including difference between X and Y such that Z is a function of X minus Y) as well as the current speed and deceleration rate of the vehicle. Once Z is determined, it may be possible to determine a maximum possible duration for turning off the engine and/or a strategy for minimizing energy draw as the vehicle approaches the intersection and is stopped at the intersection, as will be detailed below. Alternatively or additionally, a lookup table or other data structure may be stored in memory of the vehicle's control system, and a control strategy corresponding to the various current vehicle state parameters may be determined by accessing an appropriate address in the memory of the control system. After 404, method 400 continues to 406.

At 406, method 400 includes determining whether the control strategy will be enacted via an automated mode or an operator advising mode. As used herein, the automated mode may be a mode in which the control system takes actions to minimize energy draw and economize fuel independent of the vehicle operator (e.g., without requesting permission from the vehicle operator and without input from the vehicle operator). In contrast, enacting the control strategy in the operator advising mode may include advising the vehicle operator of recommended control actions for maximizing fuel economy/minimizing energy draw, where the vehicle operator may choose whether or not to take the recommended control actions. For example, the advising may occur via text displayed on a vehicle instrument panel which is viewable by the vehicle operator, or via audio alerts which are audible to the vehicle operator. In some examples, the vehicle operator may choose between the automated mode and the operator advising mode, e.g. by modifying a setting on an instrument panel of the vehicle, and that mode will always be used when the vehicle approaches an intersection with a traffic control device. In other examples, however, the controller may be authorized to determine which mode to enact independent of the vehicle operator, depending on various factors. For example, if the vehicle is rapidly approaching a stop sign, it may be preferable to enact the automated mode as there may not be enough time for the vehicle operator to respond to advice for controlling the vehicle issued by the operator advising mode. However, if the vehicle is slowly approaching a stop sign and there is adequate time for the vehicle operator to react to a visible or audible recommendation from the control system, it may be preferable to enact the operator advising mode. Accordingly, in some examples, the controller may be authorized to control vehicle operation in the automated mode during a rapid approach to a stop sign, whereas the operator advising mode may be used during a slow approach to a stop sign.

If it is determined that the control strategy should be enacted in the automated mode, method 400 proceeds to 408 to enact the control strategy in the automated mode. Enacting the control strategy in the automated mode may include, for example, turning off the engine for a maximum possible duration as the vehicle approaches the intersection and while the vehicle is stopped at the intersection. For example, in hybrid vehicles and vehicles utilizing engine stop/start control methodologies, advance detection of an upcoming stop sign may enable the control system to turn off the engine for a maximum possible duration. For example, the engine may be turned off as the vehicle approaches the stop sign, as the vehicle will be required to stop at the stop sign for a certain duration.

Alternatively or additionally, enacting the control strategy in the automated mode may include minimizing energy draw as the vehicle approaches the intersection and while the vehicle is stopped at the intersection. For example, minimizing energy draw may include load shedding and/or modifying operation of inhibiting subsystem behaviors such as those found with climate control, battery state of charge, etc. in order to achieve engine shutdown. Taking such measures may increase a possible duration of charge-depleting vehicle operation, among other advantages.

Otherwise, if it is determined that the control strategy should be enacted via the operator advising mode, method 400 proceeds to 410 to enact the control strategy in the operator advising mode. For example, enacting the control strategy in the operator advising mode may include advising the vehicle operator to take actions which will turn off the engine for a maximum possible duration as the vehicle approaches the intersection and while the vehicle is stopped at the intersection (e.g., advising the vehicle operator via a display such as an instrument panel of the vehicle or via audio alerts, as discussed above). Alternatively or additionally, enacting the control strategy in operator advising mode may include advising the vehicle operator to take actions which will minimize energy draw as the vehicle approaches the intersection and while the vehicle is stopped at the intersection.

Figure 5:
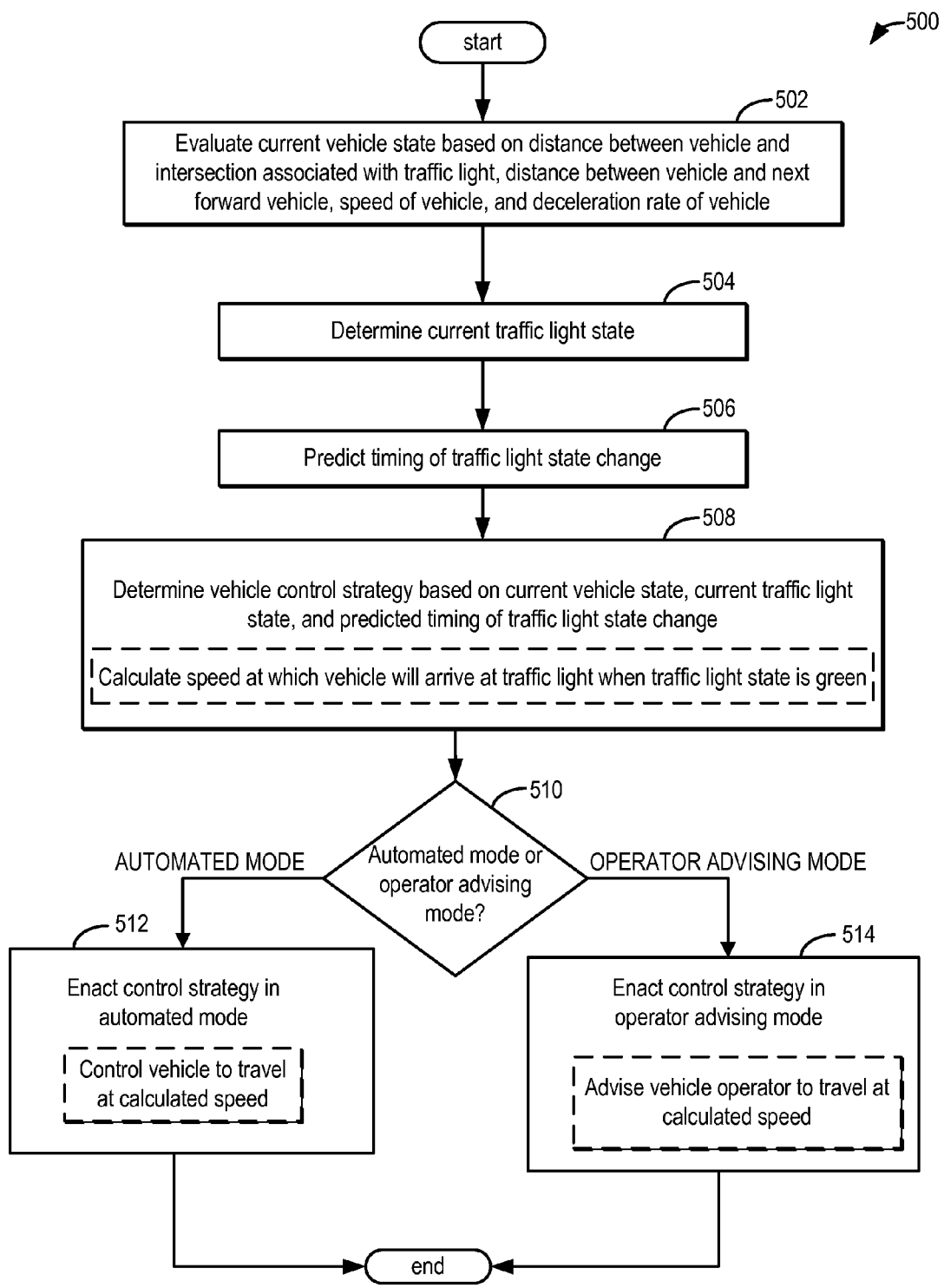
FIG. 5 shows an example method for controlling a vehicle when a traffic light is detected, to be used in conjunction with the method of FIG. 3.

Referring now to FIG. 5, it shows an example method 500 for controlling a vehicle when a traffic light is detected, to be used in conjunction with method 300 of FIG. 3. For example, method 500 may be performed at step 310 of method 300. The method of FIG. 5 may be stored as executable instructions in non-transitory memory of controller 12 shown in FIGS. 1-2.

At 502, similar to step 402 of method 400, method 500 includes evaluating a current vehicle state based on a distance between the vehicle and an intersection associated with the traffic light, a distance between the vehicle and a next forward vehicle, a speed of the vehicle, and a deceleration rate of the vehicle. After 502, method 500 continues to 504.

At 504, method 500 includes determining a current traffic light state. The current traffic light state may include red, yellow, or green, in each case referring to a particular wavelength of light emitted by the traffic light. As will be appreciated by one of ordinary skill in the art, red traffic light state may indicate that vehicles approaching the traffic light should stop at the intersection, a green traffic light state may indicate that vehicles should proceed through the intersection, and a yellow traffic light state may indicate that vehicles should slow down and stop at the intersection if possible because the traffic light state will soon change to red. Determination of the traffic light state may be accomplished by various methods. For example, the traffic light state may be determined by a visual recognition method that uses sensors to detect the traffic light state. As another example, the traffic light state may be determined by using a signal transmitted between the vehicle and a transmitter mounted on the traffic light. As yet another example, the location of the vehicle may be communicated to a central database (e.g. using GPS information, a roadside identification system, etc.) and the central database may then transmit the traffic light state of a nearby traffic light to the vehicle. It will be appreciated that the various methods for determining the traffic light state may be utilized independently of one another, or as multiple redundant verifications to improve robustness and safety. After 504, method 500 continues to 506.

At 506, method 500 includes predicting a timing of a traffic light state change. For example, once the current traffic light state has been determined, one or more timers may be initiated to predict the timing of the next state change of the traffic light. The timer(s) may make future algorithm assumptions based on a calibrated minimum time to expect between state changes, as traffic light timing may be variable. Optionally, timing information based on the location of the traffic light may be stored in an adaptive in-vehicle or external database, which may be accessed by the controller for use in predicting the timing of a state change of the traffic light. In another example, signals transmitted between the vehicle and a transmitter mounted on the traffic light (as discussed above) may indicate a time remaining until the next state change, in addition to indicating the current traffic light state. The transmitter may recognize the approaching vehicle and transmit signals to the vehicle to provide the vehicle with data regarding the current traffic light state, time remaining until the next state change, current distance between the vehicle and the intersection, etc. Finally, in examples where traffic light timing is centrally controlled, vehicle location (as determined using GPS information, a roadside identification system, or another similar method) may be used to retrieve the current traffic light state and the time remaining until the next state change, among other information.

It will be appreciated that each of the above methods for predicting a timing of a traffic light state change may be utilized independently of one another, or as multiple redundant verifications to improve robustness and safety. Further, the vehicle may be configured to evaluate the traffic light using image processing as the last check point of data to make fine adjustments to subsequent calculations with respect to the timing of the next traffic light state change.

After 506, method 500 continues to 508. At 508, method 500 includes determining a vehicle control strategy based on the current vehicle state, the current traffic light state, and the predicted timing of the traffic light state change. Whereas step 404 of method 400 includes determining a vehicle control strategy based on the current vehicle state, step 508 includes determining a vehicle control strategy based on the current vehicle state as well as based on the additional factors of current traffic light state and predicted timing of traffic light state change (e.g., because a vehicle must always stop at a stop sign, whereas a vehicle behaves differently when approaching a traffic light depending on the state/timing of the traffic light). As shown, this step optionally includes calculating a speed at which the vehicle will arrive at the traffic light when the traffic light is green. For example, the parameter Z described above with respect to method 400 may be utilized to calculate the speed at which the vehicle will need to travel in order to arrive at the traffic light when its state is green (e.g., to avoid fuel and energy inefficiencies associated with braking and then accelerating shortly thereafter due to arriving at the traffic light shortly before its state changes from red to green). If the speed limit at the vehicle's current location is known, the speed limit may also factor into the calculation of the speed at which the vehicle will need to travel to arrive at the traffic light when its state is green, along with calibration of a minimum desired speed. Such calculations may enable control of vehicle speed, engine on/off state, and braking so as to ensure that the vehicle will reach the intersection with a desired performance. The desired performance may include minimizing fuel usage, for example, by stopping the engine for a desired duration.

After 508, method 500 continues to 510. At 510, similar to step 406 of method 400, method 500 includes determining whether the control strategy will be enacted via an automated mode or an operator advising mode. In some examples, the vehicle operator may choose between the automated mode and the operator advising mode. In other examples, the controller may determine which mode to enact independent of the vehicle operator. For example, if the vehicle is rapidly approaching the traffic light, it may be preferable to enact the automated mode as there may not be enough time for the vehicle operator to respond to advice for controlling the vehicle issued by the operator advising mode.

If it is determined that the control strategy will be enacted in the automated mode, method 500 proceeds to 512 to enact the control strategy in the automated mode. Optionally, this may include controlling the vehicle to travel at the speed calculated at step 508, such that the vehicle arrives at the intersection when the traffic light is green. In other examples, similar to step 408 of method 400, enacting the control strategy in the automated mode may include turning off the engine for a maximum possible duration as the vehicle approaches the intersection and while the vehicle is stopped at the intersection. For example, if the current vehicle state and current traffic light state exclude the possibility of the vehicle arriving at the traffic light when its state is green, the control strategy may include turning off the engine as the vehicle approaches the traffic light to advantageously minimize energy draw.

Otherwise, if it is determined that the control strategy will be enacted in the operator advising mode, method 500 proceeds to 514 to enact the control strategy in the operator advising mode. Optionally, this may include advising the vehicle operator to travel at the speed calculated at step 508. The vehicle operator may then follow the advice, so as to arrive at the traffic light when it is green, or the vehicle operator may ignore the advice if desired. For example, in certain circumstances, a vehicle operator may prefer to stop at a traffic light despite the fuel and/or energy savings which may result from following the advice offered by the operator advising mode. For example, a vehicle operator may prefer to stop at an intersection in order to purchase a newspaper from a vendor situated at the intersection, or apply lipstick, or light a cigarette, or insert a compact disc into a vehicle compact disc player, etc. Thus, the operator advising mode may advantageously provide the vehicle operator with a way to economize fuel and save energy while preserving the vehicle operator's freedom to choose when to stop at a traffic light. In other examples, similar to step 410 of method 400, enacting the control strategy in the automated mode may include advising the vehicle operator to take actions which will result in the engine being turned off for a maximum possible duration as the vehicle approaches the intersection and while the vehicle is stopped at the intersection. For example, if the current vehicle state and current traffic light state exclude the possibility of the vehicle arriving at the traffic light when its state is green, the control strategy may include advising the vehicle operator to take actions which will result in the engine being turned off as the vehicle approaches the traffic light, to advantageously minimize energy draw.

In accordance with another example control strategy (not shown), the vehicle may function in an automated mode unless the vehicle operator overrides or cancels control. In one example, the engine may be automatically turned off as the vehicle coasts down to stop at an intersection, but the operator may override or cancel this control so as to keep the engine on during the coast-down period. In another example, a powertrain coast-down rate may be set while the operator's foot is off the accelerator pedal in order to arrive at the traffic light with a desired characteristic stopping algorithm to achieve a desired fuel economy and to stop the vehicle with a desired time at rest. The powertrain coast-down rate may be a function of time (e.g., time remaining to a target such as the intersection or the vehicle's destination), distance (e.g., distance remaining to a target such as the intersection or the vehicle's destination), desired rest period, etc. Further, the powertrain coast-down rate may include considerations for maximizing recharge, regeneration, etc. However, if the operator presses the accelerator pedal, the vehicle's control switches to operator advising mode until the accelerator pedal is released again. The information utilized by the operator advising mode is adjusted based on the new speed and acceleration rate of the vehicle due to the depression of the accelerator pedal.

Figure 6:
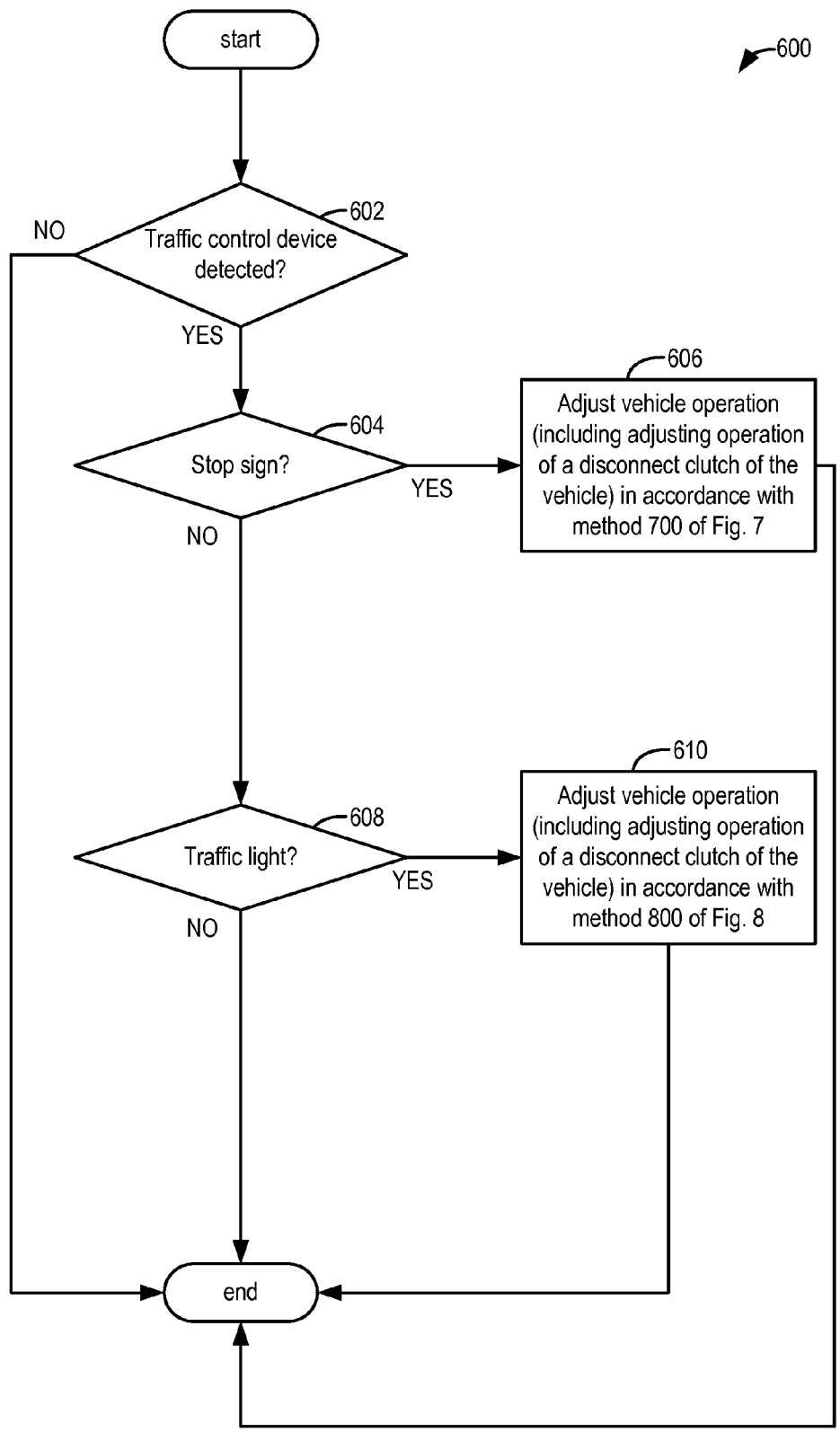
FIG. 6 shows an example method for adjusting vehicle operation, including adjusting operation of a disconnect clutch of the vehicle, based on a type of traffic control device detected.

Referring now to FIG. 6, it shows an example method 600 for adjusting vehicle operation, including adjusting operation of a disconnect clutch of the vehicle, based on a type of traffic control device detected. For example, the disconnect clutch may correspond to disconnect clutch 236 of FIG. 2. The method of FIG. 6 may be stored as executable instructions in non-transitory memory of controller 12 shown in FIGS. 1-2.

At 602, method 600 includes determining whether a traffic control device is detected. For example, a traffic control device may be detected via the methods described above with respect to FIG. 3.

If the answer at 602 is no, method 600 ends. Otherwise, method 600 proceeds to 604. At 604, method 600 includes determining whether the detected traffic control device is a stop sign. If the answer at 604 is yes, method 600 proceeds to 606 to adjust operation of the vehicle, including adjusting operation of a disconnect clutch of the vehicle, in accordance with the method 700 of FIG. 7, as detailed below. Otherwise, if the answer at 604 is no, method 600 proceeds to 608.

At 608, method 600 includes determining whether the detected traffic control device is a traffic light. If the answer at 608 is yes, method 600 proceeds to 610 to adjust operation of the vehicle, including adjusting operation of a disconnect clutch of the vehicle, in accordance with method 600 of FIG. 6, as detailed below. Otherwise, if the answer at 608 is no, method 600 ends.

In some examples, steps 604 and 608 may be performed in a different order, or simultaneously. Similarly, as opposed to determining whether the detected traffic control device is a stop sign and then determining whether the detected traffic control device is a traffic light, both of these steps may occur at step 602 (e.g., step 602 may include identifying a type of traffic control device detected, upon detection of a traffic control device).

Figure 7:
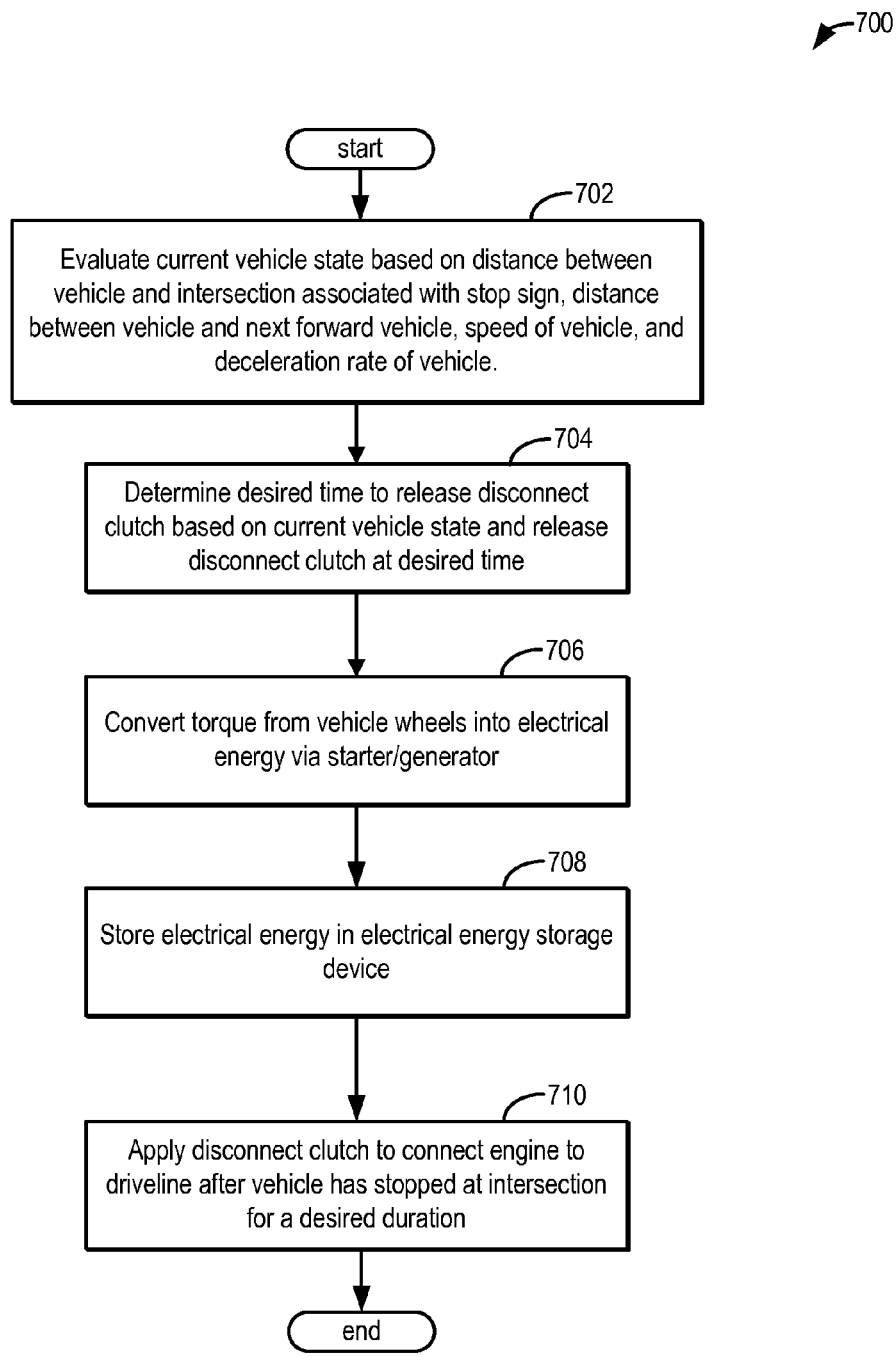
FIG. 7 shows an example method for operating a vehicle, including adjusting operation of a disconnect clutch of the vehicle, when a stop sign is detected, to be used in conjunction with the method of FIG. 6.

Referring now to FIG. 7, it shows an example method 700 for operating a vehicle and a disconnect clutch of the vehicle when a stop sign is detected. The method of FIG. 7 may be stored as executable instructions in non-transitory memory of controller 12 shown in FIGS. 1-2.

At 702, similar to step 402 of method 400, method 700 includes evaluating a current vehicle state based on a distance between the vehicle and the intersection associated with the detected stop sign, a distance between the vehicle and a next forward vehicle (if one exists), a speed of the vehicle, and a deceleration rate of the vehicle. After 702, method 700 proceeds to 704.

At 704, method 700 includes determining a desired time to release a disconnect clutch based on a current vehicle state, and releasing the disconnect clutch at the desired time. As described above with respect to FIG. 2, releasing the disconnect clutch disconnects the engine from the vehicle driveline, and thus the engine may be turned off to increase fuel efficiency while the disconnect clutch is released. Accordingly, the desired time to release the disconnect clutch may correspond to a desired time to turn off the engine based on the current vehicle state. The current vehicle state may determine a maximum possible engine-off duration—for example, if the distance between the vehicle and the intersection associated with the stop sign is relatively small, the maximum possible engine-off duration may be shorter as compared to a scenario where there is a longer distance between the vehicle and the intersection associated with the stop sign, depending on the values of the other parameters of interest (e.g. deceleration rate, distance between the vehicle and a next forward vehicle, etc.). After 704, method 700 proceeds to 706.

At 706, method 700 includes converting torque from vehicle wheels into electrical energy via the starter/generator. The starter/generator may be DISG 240 of FIG. 2, for example. During conditions where the disconnect clutch is released, the engine is decoupled from the starter/generator, and thus the conversion of wheel torque into electrical energy may be carried out (as described herein with respect to FIG. 2.) After 706, method 700 proceeds to 708.

At 708, method 700 includes storing the electrical energy (i.e., the electrical energy resulting from the conversion of wheel torque at 706) in an electrical energy storage device. For example, the electrical energy storage device may be electrical energy storage device 275 of FIG. 2. Advantageously, the electrical energy stored in the electrical energy storage device may be used to provide torque to vehicle wheels during low torque demand conditions without having to operate the engine. The stored energy may also aid in restarting the engine from a condition of no rotation, as described above with respect to FIG. 2.

After 708, method 700 proceeds to 710. At 710, method 700 includes applying the disconnect clutch to connect the engine to the driveline after the vehicle has stopped at the intersection for a desired duration. Applying the disconnect clutch to connect the engine to the driveline in this way enables the transfer of torque from the engine to the vehicle wheels, such that the vehicle may be propelled forward by the engine after stopping at the stop sign for the desired duration.

Figure 8:
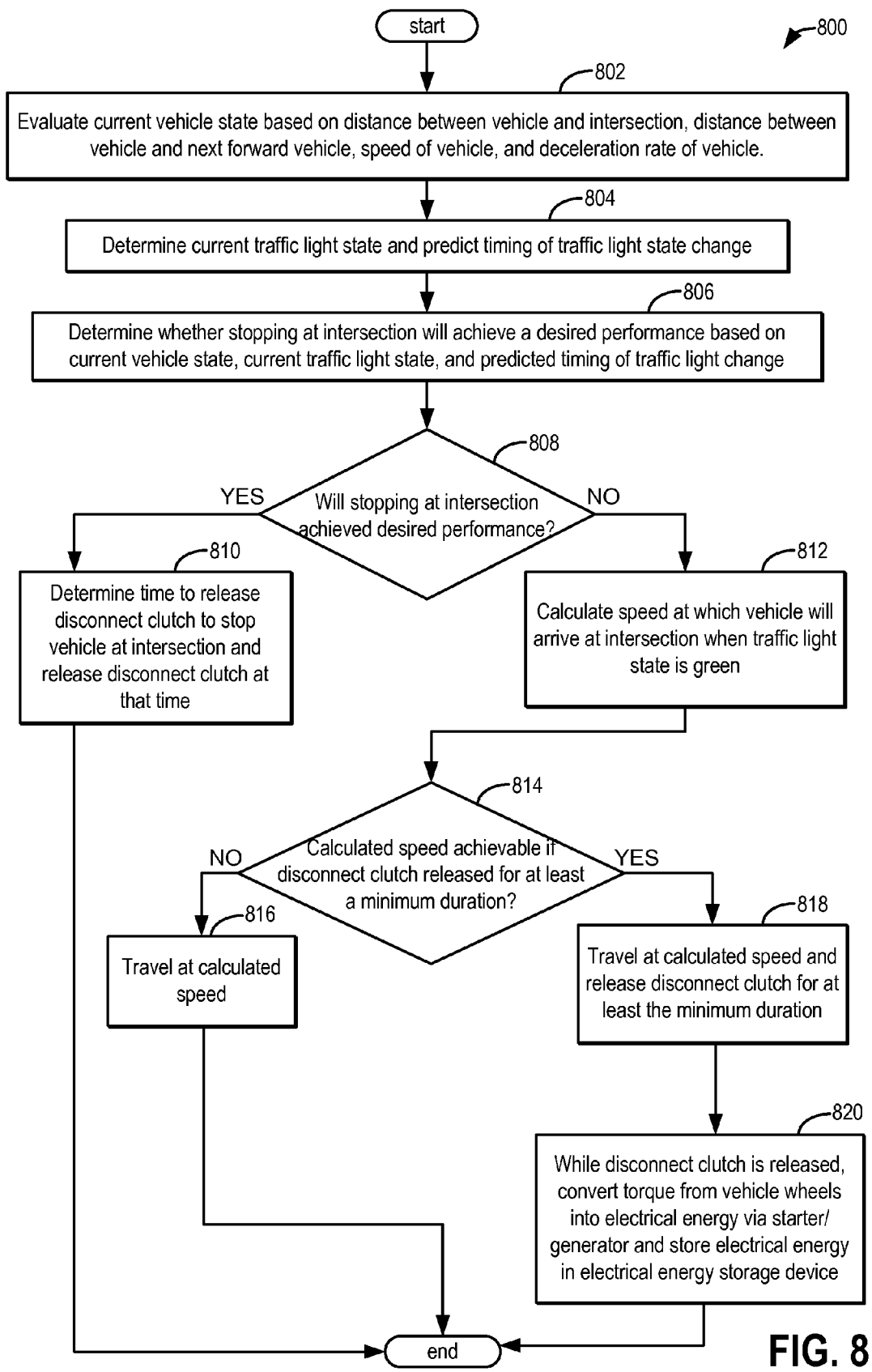
FIG. 8 shows an example method for operating a vehicle, including adjusting operation of a disconnect clutch of the vehicle, when a traffic light is detected, to be used in conjunction with the method of FIG. 6.

Referring now to FIG. 8, it shows an example method 800 for operating a vehicle and a disconnect clutch of the vehicle when a traffic light is detected. The method of FIG. 8 may be stored as executable instructions in non-transitory memory of controller 12 shown in FIGS. 1-2.

At 802, similar to step 502 of method 500, method 800 includes evaluating a current vehicle state based on a distance between the vehicle and the intersection, a distance between the vehicle and a next forward vehicle, a speed of the vehicle, and a deceleration rate of the vehicle. After 802, method 800 continues to 804.

At 804, similar to steps 504 and 506 of method 500, method 800 includes determining a current traffic light state and predicting a timing of a traffic light state change. After 804, method 800 continues to 806.

At 806, method 800 includes determining whether stopping at the intersection will achieve a desired performance based on the current vehicle state, current traffic light state, and the predicted timing of the traffic light state change. Depending on the current vehicle state, current traffic light state, and predicted timing of a traffic light state change, vehicle performance (e.g., fuel economy and/or energy efficiency) may or may not be improved by stopping at the intersection. For example, if it is predicted that the traffic light state will change from red to green shortly, stopping at the intersection may not achieve the desired performance (e.g., as the engine-off duration would be too short to justify turning the engine on and off in view of the imminent traffic light state change). In contrast, if it is predicted that a relatively long time period remains before the traffic light state will be green, stopping at the intersection may achieve the desired performance, as a longer engine-off duration may be possible. While these examples describe a determination based on predicted timing of traffic light state change alone, for the sake of simplicity, it will be appreciated that the determination is also based on current vehicle state and current traffic light state, among other factors.

After 806, method 800 continues to 808. At 808, depending on the result of the determination made at step 806, method 800 proceeds to either 810 or 812. That is, if stopping at the intersection will achieve the desired vehicle performance, method 800 continues to 810. At 810, similar to step 704 of method 700, method 800 includes determining a time to release the disconnect clutch to stop the vehicle at the intersection, and releasing the disconnect clutch at that time. After 810, method 800 ends.

Otherwise, if stopping at the intersection will not achieve a desired vehicle performance, method 800 continues from 808 to 812. At 812, similar to step 508 of method 500, method 800 includes calculating a speed at which the vehicle will arrive at the intersection when the traffic light state is green. After 812, method 800 proceeds to 814.

At 814, method 800 includes determining whether the calculated speed is achievable if the disconnect clutch is released for at least a minimum duration. As one example, if the current vehicle speed is 50 miles per hour (mph), the vehicle is not currently decelerating, and the calculated speed is 20 mph, it may be possible to achieve the calculated speed by releasing the disconnect clutch for a minimum duration (because a large decrease in speed is needed to achieve the calculated speed). However, as another example, if the current vehicle speed is 25 mph and the vehicle is decelerating at a rate of 1 mph per second, and the calculated speed is 20 mph, it may not be possible to achieve the calculated speed by releasing the disconnect clutch for a minimum duration (e.g., 5 seconds), as doing so would result in the vehicle's speed falling below the calculated speed.

If the answer at 814 is no, method 800 proceeds to 816. At 816, method 800 includes traveling at the calculated speed (e.g., traveling at the speed calculated at 814, and not releasing the disconnect clutch). After 816, method 800 ends.

Otherwise, if the answer at 814 is yes, method 800 proceeds to 818. At 818, method 800 includes traveling at the calculated speed and releasing the disconnect clutch for at least the minimum duration. For example, releasing the disconnect clutch for at least the minimum duration may enable turning off the engine for at least the minimum duration, thereby improving fuel economy and energy efficiency. After 818, method 800 proceeds to 820.

At 820, similar to steps 706 and 708 of method 700, method 800 includes, while the disconnect clutch is released, converting torque from vehicle wheels into electrical energy via the starter/generator and storing the electrical energy in an electrical energy storage device. After 820, method 800 ends.

Figure 9:
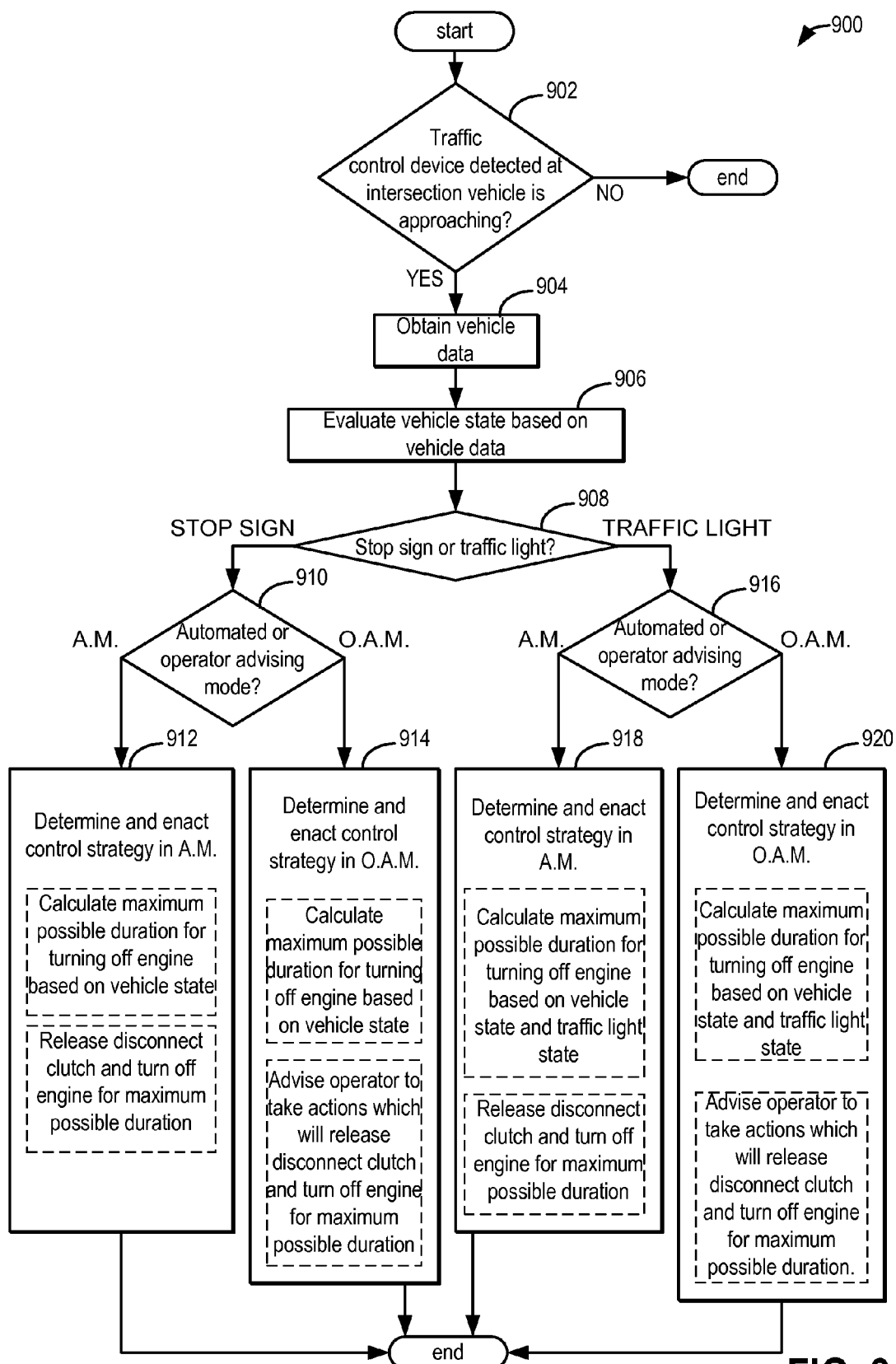
FIG. 9 shows another example method for adjusting vehicle operation, including adjusting operation of a disconnect clutch of the vehicle, based on a type of traffic control device detected.

Referring now to FIG. 9, it shows another example method for adjusting vehicle operation, including adjusting operation of a disconnect clutch of the vehicle, based on a type of traffic control device detected. The method of FIG. 9 may be stored as executable instructions in non-transitory memory of controller 12 shown in FIGS. 1-2.

At 902, method 900 includes determining if a traffic control device is detected at an intersection the vehicle is approaching. If a traffic control device is detected, the answer is yes and method 900 proceeds to 904. Otherwise, the answer is no and method 900 ends.

At 904, method 900 includes obtaining vehicle data. The vehicle data may include, for example, vehicle speed, acceleration, and location. After 904, method 900 continues to 906.

At 906, similar to steps 402, 502, and 702 of methods 400, 500, and 700, respectively, method 900 includes evaluating the state of the vehicle based on the vehicle data obtained at 904. After 906, method 900 continues to 908.

At 908, method 900 includes determining whether the traffic control device detected is a stop sign or a traffic light, e.g. in the manner described above for methods 300 and 600. If a stop sign is detected, method 900 continues to 910.

At 910, method 900 includes determining whether to utilize an automated mode or an operator advising mode, e.g. in the manner describe above for methods 400 and 500. If the answer at 910 is to utilize the automated mode, method 900 proceeds to 912.

At 912, method 900 includes determining and enacting a control strategy in automated mode. For example, the control strategy may include calculating a maximum possible duration for turning off the engine based on the vehicle state (e.g., the vehicle state evaluated at 906). Further, the control strategy may include releasing the disconnect clutch and turning off the engine for a maximum possible duration, as described above with respect to FIG. 4. After 912, method 900 ends.

Otherwise, if the answer at 910 is to utilize the operator advising mode, method 900 proceeds to 914. At 914, method 900 includes determining and enacting a control strategy in operator advising mode. For example, the control strategy may include calculating a maximum possible duration for turning off the engine based on the vehicle state (e.g., the vehicle state evaluated at 906). Further, the control strategy may include advising the vehicle operator to take actions which will result in the disconnect clutch being released and the engine being turned off for a maximum possible duration, as described above with respect to FIG. 4. After 914, method 900 ends.

However, if it is determined at 908 that a traffic light is detected, method 900 proceeds to 916. At 916, method 900 includes determining whether to utilize an automated mode or an operator advising mode, e.g. in the manner describe above for methods 400 and 500. If the answer at 916 is to utilize the automated mode, method 900 proceeds to 918.

At 918, method 900 includes determining and enacting a control strategy in automated mode. For example, the control strategy may include calculating a maximum possible duration for turning off the engine based on the vehicle state (i.e., the vehicle state evaluated at 906) and a traffic light state. Thus, in contrast to step 912 where the maximum possible duration for turning off the engine is based on the vehicle state alone, step 918 also considers the state of the traffic light in determining the maximum possible duration for turning off the engine. Further, the control strategy may include releasing the disconnect clutch and turning off the engine for a maximum possible duration, as described above with respect to FIG. 4. After 918, method 900 ends.

Otherwise, if the answer at 916 is to utilize the operator advising mode, method 900 proceeds to 920. At 920, method 900 includes determining and enacting a control strategy in operator advising mode. For example, the control strategy may include calculating a maximum possible duration for turning off the engine based on the vehicle state (i.e., the vehicle state evaluated at 906) and a traffic light state. Further, the control strategy may include advising the vehicle operator to take actions which will release the disconnect clutch and turn off the engine for a maximum possible duration, as described above with respect to FIG. 4. After 920, method 900 ends.

It will be appreciated that in further embodiments, automated and operator advising control modes may emphasize safety in addition to or instead of fuel economy and energy efficiency.

For example, when the vehicle is approaching an intersection with a stop sign, an operator alert (e.g., an instrument panel or audio alert) may inform the operator of the upcoming stop sign. In this way, an otherwise distracted vehicle operator may realize it is necessary to stop at the intersection rather than comprising her own safety and the safety of other operators of other vehicles and pedestrians by failing to stop at the intersection. Alternatively, when the vehicle is approaching an intersection with a traffic light, the operator alert may inform the operator of the upcoming traffic light including information about the traffic light state and predicted timing of the next state change. In this way, the operator may make an informed decision, for example whether to maintain current vehicle speed/accelerate (when there is enough time for the vehicle to safely proceed through the intersection while the light is green or yellow) or brake (when there is not enough time for the vehicle to safely proceed through the intersection before the traffic light changes from yellow to red).

As another example, parental warning and control modes are anticipated. While the term "parental" may refer to parents of a junior (e.g., teenaged) vehicle operator in this context, it may also refer more broadly to tracking and controlling the behavior of a vehicle operator of any age. For example, during operation in a parental warning mode, the vehicle may be configured to transmit a text message, email, etc. or store an incident report when the vehicle does not stop for a required duration at a stop sign, or does not stop at the stop sign at all. Further, the vehicle may be configured to transmit a text message, email, etc. or store an incident report when the vehicle violates a traffic light by proceeding through the intersection when the traffic light state is red (and/or when the traffic light state is yellow and a time remaining before the next traffic light state change is less than a predetermined time). In accordance with a parental control mode, a predetermined vehicle rest time may be automatically enforced when the vehicle arrives at an intersection with a stop sign. Similarly, a vehicle stop may be enforced when the vehicle arrives at an intersection with a traffic light in the red state when an appropriate stopping distance is detected. In either case (stop sign or traffic light), an operator override option may be available. The operator override option may be enacted by the operator pressing then releasing the brake pedal and/or accelerator pedal, or by detection of an impending collision (e.g. a rear, side, or front collision), lane departure, cancel button activation, abrupt steering, ABS/traction control activation, etc. Further, desired vehicle performance may be tailored by the operator to prioritize or configure a desired response accordance to his preferences.

For example, if a vehicle will soon arrive at an intersection with a stop sign, the vehicle should be stopped for a certain duration upon arriving at the intersection. As such, upon detection of an upcoming stop sign, the vehicle may be controlled in a manner that increases safety and fuel efficiency in view of the upcoming stop. In contrast, if it is determined that the vehicle will soon arrive at an intersection with a traffic light, a further determination can be made as to whether or not the vehicle will need to stop upon arriving at the intersection, and if so for how long, based on various factors such as the status of the traffic signal (e.g., the color of the light and the time remaining until the color changes) and the distance of separation between the vehicle and a forward vehicle in the same lane (if one exists). Based on such determinations, an appropriate control strategy may be utilized as the vehicle approaches and arrives at the intersection with the traffic light.

It will be appreciated that the methods described herein are provided by way of example, and thus, are not meant to be limiting. Therefore, it is to be understood that the methods described herein may include additional and/or alternative steps than those illustrated in FIGS. 3-9, without departing from the scope of this disclosure. Further, it will be appreciated that the methods described herein are not limited to the order illustrated; rather, one or more steps may be rearranged or omitted without departing from the scope of this disclosure.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the example routines may graphically represent code to be programmed into the computer readable storage medium in the controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   determining, with a vehicle controller, a type of a detected traffic control device;
   if the detected traffic control device is a traffic signal:
     determining, with the controller, whether a calculated speed to arrive at an intersection when a traffic light state is green is achievable if a vehicle disconnect clutch to disconnect a vehicle engine from a vehicle driveline is released for a minimum duration, and if so, traveling at the calculated speed and releasing the disconnect clutch for at least the minimum duration and while the clutch is released, converting vehicle wheel torque into electrical energy via a starter/generator for storage in a storage device;
     otherwise, traveling at the calculated speed and not releasing the disconnect clutch.

2. The method of claim 1 further comprising,
   if the detected traffic control device is a stop sign:
     evaluating a current vehicle state with the controller, the current vehicle state based on a distance between the vehicle and an intersection associated with the stop sign, a distance between the vehicle and a next forward vehicle, a speed of the vehicle, and a deceleration rate of the vehicle.

3. The method of claim 2, further comprising, if the traffic device is a stop sign, releasing the disconnect clutch for a maximum possible duration with the controller, the maximum possible duration based on the current vehicle state.

4. The method of claim 1 further comprising, if the traffic device is a stop sign, adjusting vehicle operation with the controller to minimize energy draw as the vehicle approaches an intersection and while the vehicle is stopped at the intersection.

5. The method of claim 1, further comprising determining, with the controller, a current vehicle state; wherein the current vehicle state is based on a distance between the vehicle and an intersection, a distance between the vehicle and a next forward vehicle, a speed of the vehicle, and a deceleration rate of the vehicle.

6. The method of claim 1, wherein the calculated speed to arrive at an intersection when a traffic light state is green is based on a current vehicle state, a current traffic light state, and a predicted timing of traffic light change, the current vehicle state based on a distance between the vehicle and an intersection associated with the traffic light, a distance between the vehicle and a next forward vehicle, a speed of the vehicle, and a deceleration rate of the vehicle.

7. A method, comprising:
   detecting, with a controller of a vehicle, a traffic control device at an intersection the vehicle is approaching;
   if the detected traffic control device is a stop sign, determining, with the controller, a desired time to release a disconnect clutch arranged in a driveline of the vehicle and releasing the disconnect clutch at the desired time; and
   if the detected traffic control device is a traffic light, determining, with the controller, whether stopping at the intersection will achieve a desired vehicle performance;
   if stopping at the intersection will achieve the desired vehicle performance, determining a time to release the disconnect clutch to stop the vehicle at the intersection and releasing the disconnect clutch at that time;

otherwise, calculating a speed at which the vehicle will arrive at the intersection when a traffic light state is green; and traveling at the calculated speed.

8. The method of claim 7, wherein releasing the disconnect clutch disconnects an engine of the vehicle from the driveline, and wherein applying the disconnect clutch connects the engine to the driveline.

9. The method of claim 7 wherein, if the detected traffic control device is a stop sign, the desired time to release the disconnect clutch is determined by the controller based on a current vehicle state, the current vehicle state based on a distance between the vehicle and the intersection, a distance between the vehicle and a next forward vehicle, a speed of the vehicle, and a deceleration rate of the vehicle.

10. The method of claim 9 further comprising, if the detected traffic control device is a stop sign:

after releasing the disconnect clutch:
converting torque from vehicle wheels into electrical energy via a starter/generator;
storing the electrical energy in an electrical energy storage device; and
applying the disconnect clutch to connect an engine of the vehicle to the driveline after the vehicle has stopped at the intersection for a desired duration.

11. The method of claim 8 further comprising, if the detected traffic control device is a traffic light:

evaluating a current vehicle state with the controller, the current vehicle state based on a distance between the vehicle and the intersection, a distance between the vehicle and a next forward vehicle, a speed of the vehicle, and a deceleration rate of the vehicle;
determining a current traffic light state;
predicting a timing of a traffic light state change;
wherein the determination of whether stopping at the intersection will achieve the desired vehicle performance is based on the current vehicle state, the current traffic light state, and the predicted timing of the traffic light state change.

12. The method of claim 7, further comprising determining whether the calculated speed may be achieved if the disconnect clutch is released for at least a minimum duration, and if so, releasing the disconnect clutch for at least the minimum duration.

13. The method of claim 12, further comprising:
while the disconnect clutch is released:
converting torque from vehicle wheels into electrical energy via a starter/generator; and
storing the electrical energy in an electrical energy storage device.

14. A method for operating a vehicle, comprising:
detecting a traffic control device at an intersection the vehicle is approaching with a controller of the vehicle;
obtaining vehicle data with the controller;
evaluating a vehicle state based on the vehicle data with the controller;
if the traffic control device is a stop sign, calculating, with the controller, a maximum possible duration for turning off an engine of the vehicle based on the vehicle state;
if the traffic control device is a traffic light, calculating, with the controller, a desired duration for turning off the engine based on the vehicle state and a traffic light state;
turning off the engine with the controller and releasing a disconnect clutch to disconnect the engine from a driveline of the vehicle;
while the engine is disconnected from the driveline, converting torque from vehicle wheels into electrical energy via a starter/generator and storing the electrical energy in an electrical energy storage device; and then
applying the disconnect clutch to connect the engine to the driveline after the vehicle has stopped at the intersection for the maximum possible duration.

15. The method of claim 14 further comprising selecting either an automated mode or an operator advising mode by a vehicle operator, and selecting one or more of a safety mode and a fuel efficiency mode by the vehicle operator.

* * * * *